(12) United States Patent
Fujita et al.

(10) Patent No.: US 6,301,511 B1
(45) Date of Patent: Oct. 9, 2001

(54) NUMERICAL CONTROL UNIT FOR TURNING MECHANISM

(75) Inventors: Jun Fujita, Mishima; Kiyoshi Inoue, Shizuoka-ken; Hideki Hayashi, Susono, all of (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/066,596

(22) Filed: Apr. 27, 1998

(30) Foreign Application Priority Data

Apr. 30, 1997 (JP) .................................................. 9-112469

(51) Int. Cl.⁷ .............................. G05B 11/01; G05B 11/32
(52) U.S. Cl. .................................. 700/71; 700/69; 700/70; 318/560; 318/561; 318/568.1; 318/568.22; 318/600
(58) Field of Search ................................. 700/71, 69, 70; 318/560, 561, 600, 568.1, 568.22

(56) References Cited

U.S. PATENT DOCUMENTS

| | | | | |
|---|---|---|---|---|
| 3,742,326 | * | 6/1973 | Okuda et al. ........................ | 318/603 |
| 3,896,361 | * | 7/1975 | Inaba et al. ........................... | 318/616 |
| 4,096,770 | * | 6/1978 | Tanner ........................................ | 82/1 |
| 4,228,617 | * | 10/1980 | Bando ..................................... | 451/5 |
| 4,338,659 | * | 7/1982 | Kurakake ............................. | 364/170 |
| 4,396,975 | * | 8/1983 | Kurakake ............................. | 364/161 |
| 4,750,104 | * | 6/1988 | Kumamoto et al. .................. | 364/167 |
| 5,021,941 | * | 6/1991 | Ford et al. ............................ | 364/176 |
| 5,105,137 | * | 4/1992 | Iijima ................................ | 318/568.22 |
| 5,158,783 | * | 10/1992 | Inaba et al. ........................... | 425/145 |
| 5,175,680 | * | 12/1992 | Yoneda et al. ........................ | 364/176 |
| 5,216,342 | * | 6/1993 | Torii et al. ......................... | 318/568.1 |

FOREIGN PATENT DOCUMENTS

| | | | |
|---|---|---|---|
| 406274228A | * | 9/1994 | (JP) ...................................... 318/600 |
| 10-43976 | | 2/1998 | (JP) . |

* cited by examiner

Primary Examiner—Ayaz Sheikh
Assistant Examiner—Frantz Jean
(74) Attorney, Agent, or Firm—Finnegan, Henderson, Farabow, Garrett & Dunner, L.L.P.

(57) ABSTRACT

A numeric control device of a turning mechanism which turns a turning body from a driving source which circularly moves through a non-linear transmitting mechanism has a coordinate transformation device outputting a signal which converts an inputted turning angular signal into a position of the driving source, and a compensator outputting a signal which is derived from computing a positional error of the driving source in accordance with the turning angular signal, and the control of the driving source is carried out by a servo-input signal which is derived from the sum of a conversion signal outputted from the coordinate transformation device and a compensation signal outputted from the compensator. Since the numerical control mechanism of the present invention controls the driving source with addition of the compensation signal, it becomes possible to stabilize the turning velocity of the turning body with high accuracy.

8 Claims, 10 Drawing Sheets

NUMERICAL CONTROL UNIT FOR TURNING MECHANISM

BACKGROUND OF THE INVENTION

1. Field of the Invention

The present invention relates to a numeric control unit for a turning mechanism which turns a turning body around a designated turning shaft through a non-linear transmitting mechanism by a driving source moving in a non-circular movement.

2. Description of the Related Art

Conventionally, in a machine tool or the like which is provided with a turning mechanism which turns a turning body around a designated turning shaft, a turning mechanism which has a driving source to move in a linear motion, and a transmitting mechanism which transmits the linear motion by the driving source to the turning body. As for a transmitting mechanism, a rack and pinion mechanism, a worm-gear mechanism and so on are used.

Among such turning mechanisms, there is a turning mechanism which turns a turning body using a cam mechanism, for instance, a turning mechanism shown in Japanese Patent Application No. Hei 8-198035.

Figure 12:
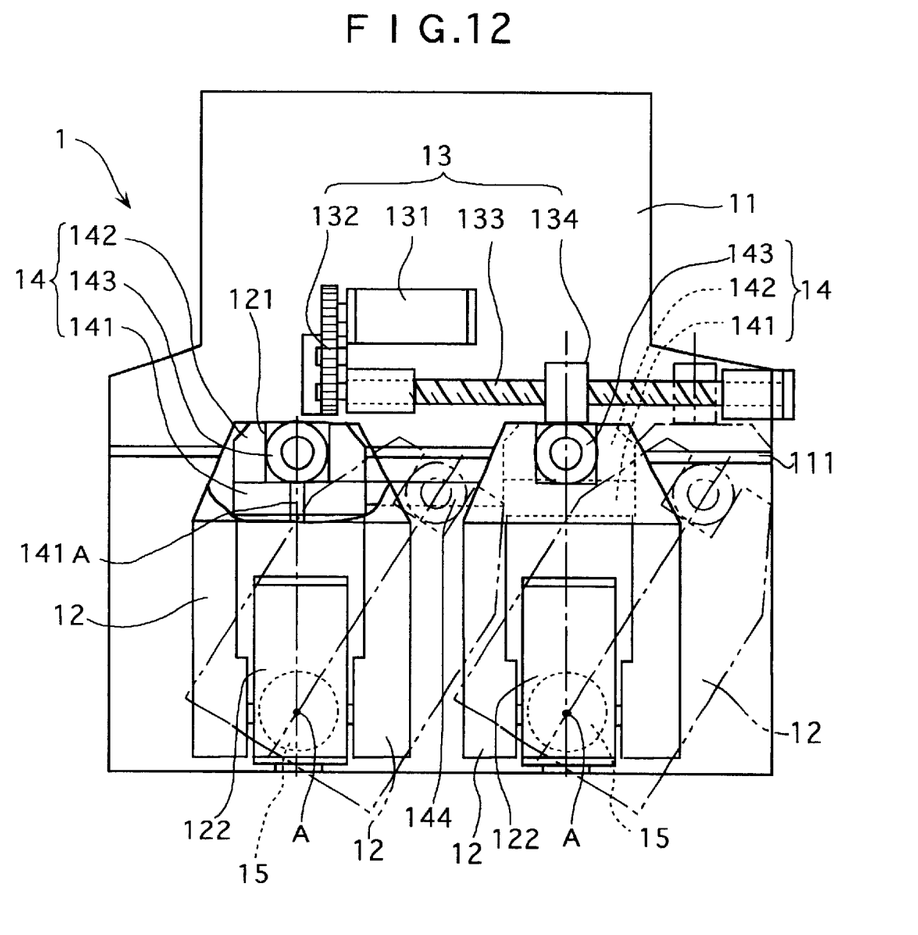
FIG. 12 is a front view representing the turning mechanism shown in a related art.

This turning mechanism 1 is formed, as shown in FIG. 12, including a turning bodies 12 supported by a base member 11 as possible to turn, a driving source 13 which turns the turning body 12 and a transmitting mechanism 14 which transmits the movement of the driving source 13 to the turning body 12.

The turning body 12 is supported by a supporting shaft 15 as possible to turn around a turning shaft A to a base member 11, and on the tip thereof, a concave portion 121 is formed to engage in a connecting shaft 143 which will be explained later.

A main shaft head 122 in a built-in motor system is provided near the turning shaft A of the turning body 12, and it becomes possible that the main shaft head 122 turns in accordance with the turning movement of the turning body 12 to perform various processing on a work piece.

The driving source 13 is provided with: a servo-motor 131; a pinion gear 132 which meshes with a gear wheel provided on the tip of the revolving shaft of the servo-motor 131; a feed screw rod 133 rotated by the pinion 132 in accordance with the revolution of the revolving shaft of the servo-motor 131; and a feed nut 134 which screws with the feed screw rod 133, and moves in a linear movement along the extending direction of the feed screw rod 133.

A transmitting mechanism 14 which transmits a linear movement of the feed nut 134 of the driving source 13 to the turning body 12 is comprised with a horizontal slider 141, a vertical slider 142, and a connecting shaft 143.

The horizontal slider 141 is attached in a movable manner in the extending direction of the horizontal guide 111 which is linearly mounted on the base member 11, and a vertical guide 141A perpendicularly extending into the extending direction of the horizontal guide 111 is constructed on the upper surface of the slider 141.

The vertical slider 142 is attached in a movable manner in the direction of the vertical guide 141A and the connecting shaft 143 which engages with the concave portion 121 of the turning shaft 12, is provided on the upper surface of the vertical slider 142.

The feed nut 134 of the driving source 13 is jointly fixed to the horizontal slider 141 on the right.

The horizontal sliders 141 provided on the two turning bodies 12 respectively, are connected to each other by a connecting rod 144, and according to the turning movement of the turning body 12 shown in the right side on FIG. 12, the other turning body 12 also turns.

The turning mechanism 1 behaves as follows.

1) When the servo-motor turns, the feed screw rod 133 rotates through the pinion gear 132.
2) The feed nut 134 moves along the direction extending from the feed screw rod 133 by the rotation of the feed screw rod 133.
3) In accordance with the movement of the feed nut 134, the horizontal slider 141 moves and the turning body 12 turns through the connecting shaft 143.

While the horizontal slider 141 is moving, the connecting shaft 143 moves with the vertical slider 142 along the vertical guide 141A to maintain engagement with the concave portion 121 of the turning body 12.

Figure 13:
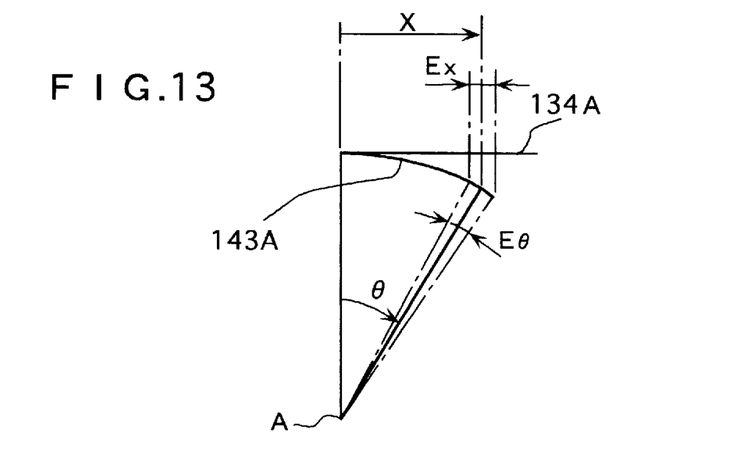
FIG. 13 is a schematical view showing a moving track of the turning mechanism in FIG. 12.

As shown in FIG. 13, a path 143A of the connecting shaft 143 form an arc in θ direction around the turning shaft A to a path 134A of the feed nut 134 in the X direction.

According to the turning mechanism 1, a linear movement of the driving source 13 can be transmitted to the turning movement of the turning body 12 through a simple motion along the guides 111 and 141A of the horizontal slider 141 and the vertical slider 142.

Therefore, a turning mechanism having an extreme durability can be formed with no fear of a turning motion failure caused by the abrasion of the mesh portion as in the case of a rack and pinion mechanism or a worm gear mechanism.

When plural turning bodies 12 in a rack and pinion transmitting mechanism and the like are placed adjacent to each other, it is necessary to take a large space interval for each element so that the gear of the adjacent transmitting mechanism does not interfere with each other. On the other hand, when the turning mechanism 1 described above is used, there is no need to take it into consideration, and the turning bodies 12 can be placed near to each other, so that a machine tool having plural turning bodies can be made small size.

In order to machine a work piece with high precision with the turning mechanism 1 in a machine tool and the like, it is necessary to enhance the positioning precision of the turning body to the inputted turn angle signal, and stabilize the turn velocity of the turning body with high precision. Particularly, in a multi-shaft high precision machine tool for contour processing such as a profiler and the like, achievement of a high precision in positioning and turn velocity is an important subject.

However, as shown in FIG. 13, since such a turning mechanism 1 converts a linear movement of the feed nut 134 into a turn movement of the turning body 12, the distance between the turning shaft A and a driving point of the straight line (the position of the feed nut 134) of the driving source 13 varies in accordance with the turn angles θ. This means that even when the feed nut 134 moves with constant velocity along the path 134A, the turn velocity of the turning body 12 varies.

Therefore, in order to turn the turning body 12 while maintaining constant turn velocity, the linear movement of the driving source 13 must be controlled to change in response to the turn angles θ.

More specifically, since the linear movement of the driving source 13 is converted to the turning movement of the turning body 12, the driving source 13 must be driven with trigonometric-functionally changing the movement velocity of the driving source 13.

When a positional error (droop) Ex arises at the driving point of the straight line of the driving source 13, a positional error $E_\theta$ of the turning body which follows the linear movement varies in accordance with the turn angles.

Accordingly, the positional error $E_\theta$ must be controlled in response to the angles θ to be the same as in the case of direct driving through the revolution driving source.

Such a subject is grasped not only in the turning mechanism 1 which transmits the movement of the driving source 13 to the turning body through the transmitting mechanism 14, but also in the turning mechanism which applies a non-linear transmitting mechanism such as a link mechanism and the like.

In a numerical control device of a turning mechanism which turns a turning body with a non-circularly-moving driving source through a non-linear transmitting mechanism, it is an object of the present invention to provide a numerical control device of a turning mechanism which enables it to stabilize the turn velocity of the turning body with a high precision and to control the droop of the driving source in a similar manner to the case when driven with a revolution driving source.

SUMMARY OF THE INVENTION

Figure 1:
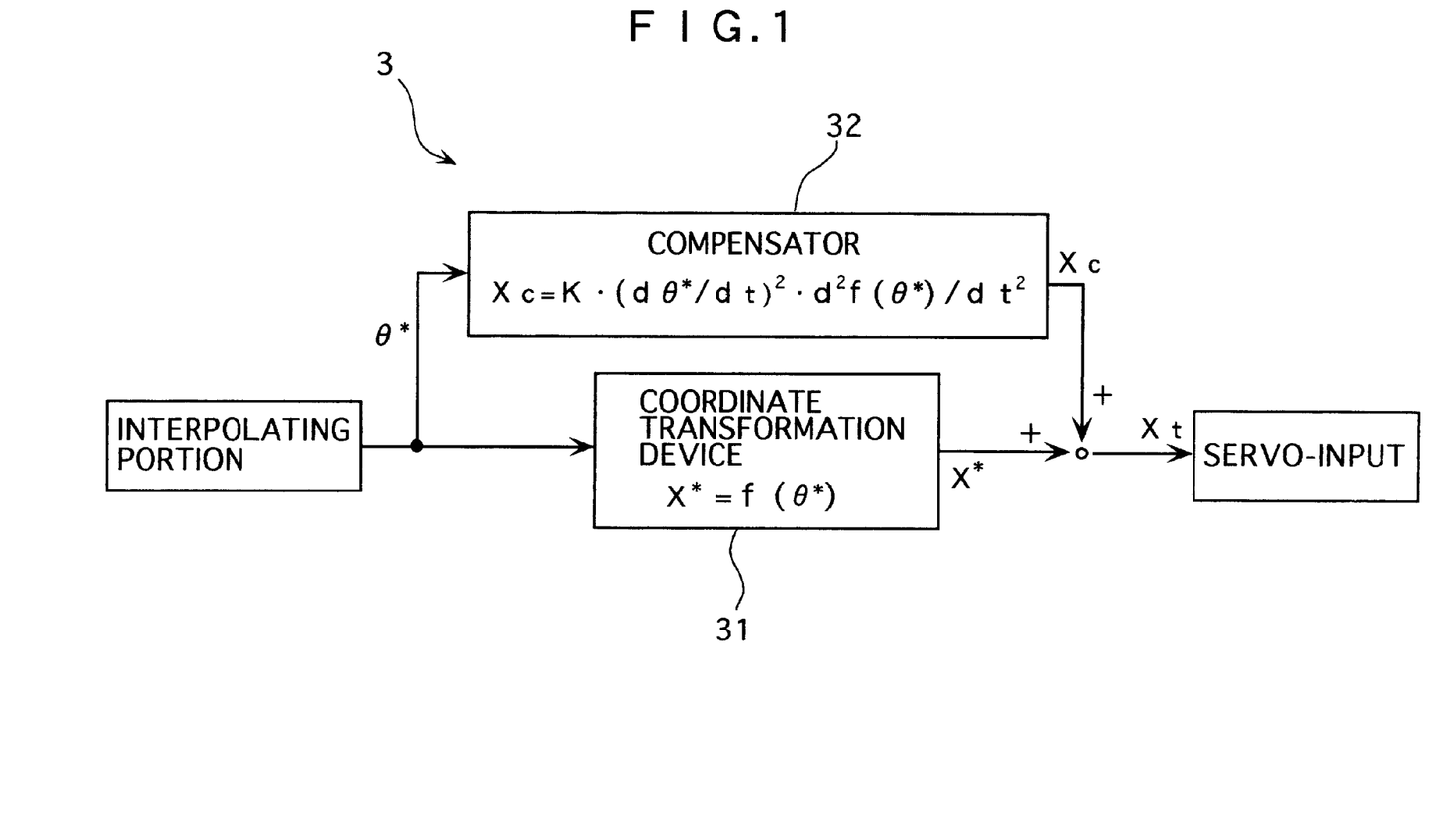
FIG. 1 is a block diagram showing a processing of a numeric control device relating to a first embodiment of the present invention.

A numerical control device of a turning mechanism according to the present invention is, as explained in the block diagram shown in FIG. 1, a numerical control device 3 of a turning mechanism which turns a turning body around a designated turning shaft with a non-circularly moving driving source through a non-linear transmitting mechanism. The numerical control device of the present invention is characterized in that it has a coordinate transformation device 31 outputting a signal which converts an inputted turn angle signal θ* to the position of the driving source described above, and a compensator 32 outputting a signal which computes the compensation value for the driving source in accordance with the turn angle signal, and the driving source is controlled using a servo input signal $X_t$, which is the sum of the conversion signal X* outputted from the above described coordinate transformation device 31 and the compensation signal Xc outputted from the compensator 32 described above.

Here, a non-linear transmitting mechanism means a transmitting mechanism in which a change of position of a driving source does not linearly become a change of the turning position of a turning body, and a cam mechanism, a link mechanism and so on can be cited for instance.

A non-circular movement of a driving source means a movement excluding that a driving point of a driving source circularly moves, and mainly means that the driving point linearly moves in a reciprocal motion. But it also includes a polygonal movement of the driving point.

More specifically, as the driving source whose driving point linearly moves, a driving source which has a servo-motor, a feed screw rotating with the turn of the turning shaft of the servo-motor, and a feed nut linearly moving along the extending direction of the feed screw is conceivable.

According to the present invention, since the numerical control device 3 has the coordinate transformer 31 and the compensator 32 and the servo-input signal Xt of the driving source is composed of the sum of the conversion signal X* outputted from the coordinate transformer 31 and the conpensator 32 and the compensation signal Xc, even in a turning mechanism which turns a turning body with a driving source moving in a non-circular movement through a non-linear transmitting mechanism, the turn velocity of the turning body can be stabilized with high precision. And since the NC device has a compensator 31, it becomes possible to make a similar turning motion directly moving a turning body with a revolution driving source by compensating with the compensation signal Xc.

As the compensator, it is preferable to adopt a compensator 32 outputting the compensation signal Xc in which the turn angle signal θ* is multiplied by a coefficient proportional to a square of the angular velocity of the turning body.

In other words, during the turning motion of the turning body at a constant velocity, the relations as shown in the equation (1) stand up among the position X of the driving source, the turn angles θ, and the time t.

X: position of the linear driving of the driving source.
θ: the turn angles of the turning body
t: time
X=f (θ), X and θ are all functions of t.
The velocity of X is as follows.

$$\frac{dX}{dt} = \frac{dX}{d\theta} \cdot \frac{d\theta}{dt}$$

(The character "·" means multiplication)
The acceleration of X is as follows.

$$\frac{d^2X}{dt^2} = \frac{d}{dt}\left(\frac{dX}{d\theta} \cdot \frac{d\theta}{dt}\right) \qquad (1)$$
$$= \frac{dX}{d\theta} \cdot \frac{d^2\theta}{dt^2} + \frac{d\theta}{dt}\left\{\frac{d}{dt}\left(\frac{dX}{d\theta}\right)\right\}$$
$$= \frac{dX}{d\theta} \cdot \frac{d^2\theta}{dt^2} + \frac{d\theta}{dt}\left\{\frac{d\theta}{dt}\left(\frac{d^2X}{d\theta^2}\right)\right\}$$

In the above equation (1), since the angular velocity of the turning body is desirably controlled to keep constant, the angular acceleration becomes 0, thus the equation (1) is rearranged into the equation (2).

$$\frac{d^2\theta}{dt^2} = 0 \qquad (2)$$
$$\therefore \frac{d^2X}{dt^2} = \left(\frac{d\theta}{dt}\right)^2 \cdot \frac{d^2X}{d\theta^2}$$

Even when the turning body turns at a constant velocity, the velocity of the driving source changes. Since the acceleration of the above velocity affects the droop error and the like, assuming that the compensation signal Xc by the compensator is proportional to the acceleration of the driving source, the equation (3) is realized.

$$X_C = K \cdot \left(\frac{d\theta}{dt}\right)^2 \cdot \frac{d^2X}{d\theta^2} \qquad (3)$$

Therefore, it is understood that the compensation signal Xc compensating the positional deviation has a factor proportional to a square of the angular velocity of the turning body (dθ/dt).

In other words, since the compensation signal Xc becomes large as the angular velocity of the turning body is set larger, especially when the machine tool is operated at high velocity, the effect of the compensator 32 becomes greater. Thus, the turning body turned by the turning mechanism with the numerical control device of the present invention can be stably turned with higher precision, irrespective of the velocity of the turning body.

As a result of simulation described below, it has been known that the effect of the compensator becomes great when K is set as : $K=\frac{1}{2}\omega_0^2$.

Figure 2:
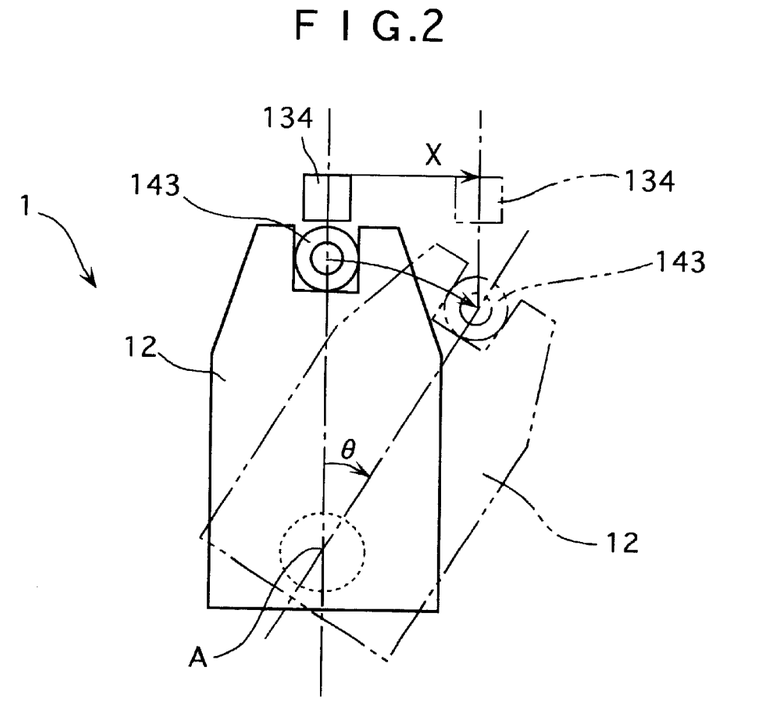
FIG. 2 is a front view showing a turning motion of a turning mechanism relating to the above embodiment.

Further, as shown in FIG. 2, when the connecting shaft 143 connecting the turning body 12 and the feed nut 134 as a linearly moving driving source, moves along an arc orbit of the radius R of the turning body, it is preferable that the conversion signal X* by the coordinate transformation device 31 is set as $$X^* = R \cdot \sin(\theta^*)$$

and the compensation signal Xc by the compensator 32 is set as $$X_C = \frac{R}{2} \cdot \frac{(d\theta^*/dt)^2}{\omega_0^2} \cdot \sin\theta^*$$

Figure 3:
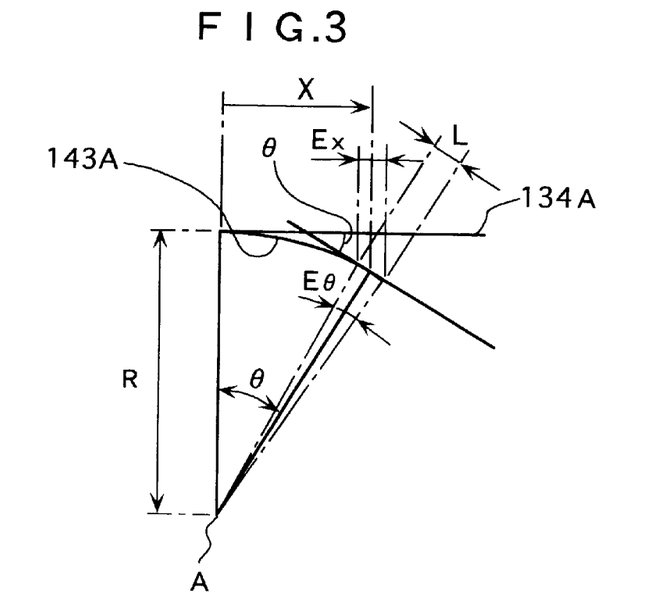
FIG. 3 is a schematical view showing a track of the turning motion of the turning mechanism in FIG. 2.

That is, as shown in a schematical figure in FIG. 3, the connecting shaft 143 moves along the arc-shaped orbits 143A while the feed nut 134 draws the linear path 134A.

Therefore, since the positional error Ex of the feed nut can be converted into cosine of the positional error L (angular error E$\theta$) of the connecting shaft 143, the control position X* and the positional error Ex under the circumstance can be computed according to the inputted turn angle signal $\theta$ and it becomes possible to largely reduce the tracking error of the turning body resulting from the droop of the driving source.

Figure 8:
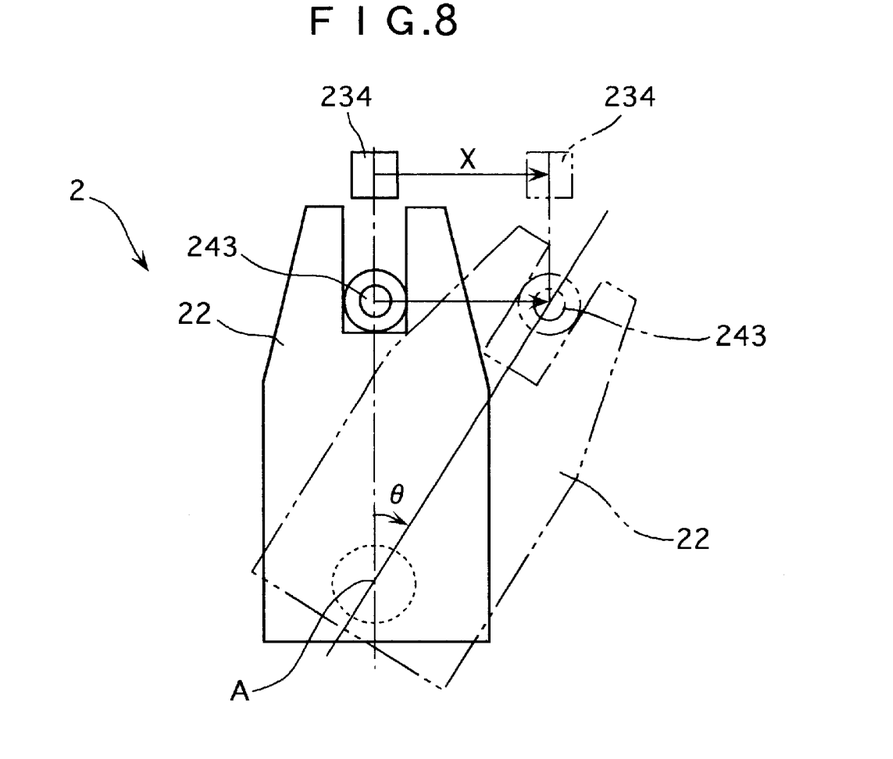
FIG. 8 is a front view showing the turning motion of the turning mechanism in a second embodiment of the present invention.

As shown in FIG. 8, when the connecting shaft 243 connecting the turning body 22 and the feed nut 234 moves in its moving direction, namely, along the linear track, it is preferable that the conversion signal X* by the coordinate transformer 31 is taken as $$X^* = R \cdot \tan(\theta)$$

and the compensation signal Xc by the compensator 32

$$X_C = R \cdot \left(\frac{d\theta^*}{dt}\right)^2 \cdot \tan\theta^* \cdot \frac{(1+\tan^2\theta^*)}{\omega_0^2}$$

Figure 9:
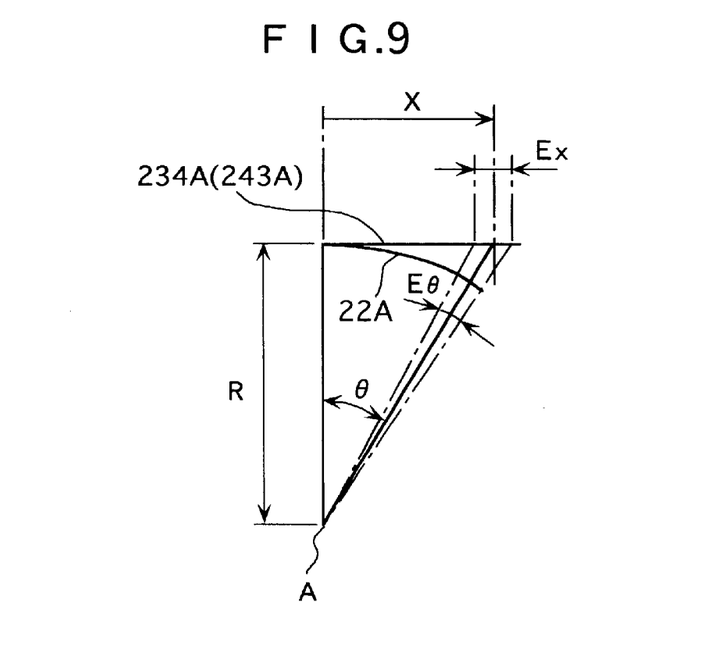
FIG. 9 is a schematical view showing the track of the turning motion of the turning mechanism in FIG. 8.

That is, as shown in a schematical figure in FIG. 9, since the positional error (the angular error E$\theta$) on the arc-shaped orbit of the turning body 22 can be converted into the positional error Ex in the moving direction of the feed nut 234 through a sine, it is possible to compute the positional error Ex according to the inputted turn angle signal $\theta^*$ and to largely reduce the tracking error of the turning body resulting from the droop of the driving source.

DETAILED DESCRIPTION OF THE PREFERRED EMBODIMENT(S)

A first embodiment of the present invention will be explained based on the drawings as below. Incidentally, for a member or a component which is the same as or similar to the member or the component already explained, the description thereof will be omitted or simplified.

As described above FIG. 2, a turning mechanism 1 relating to a first embodiment has a similar structure to that explained in the conventional example.

The turning mechanism 1 is provided with a turning body 12, a feed nut 134, a connecting shaft 143 having the feed nut 134 through a horizontal slider and a vertical slider (omitted in FIG. 2). A schematical view of the path of the connecting shaft 143 and the path of the feed nut is shown in FIG. 3.

Above-described conversion signal X* and a compensation signal are computed as follows.

That is, since the path of the connecting shaft 143 move along an arc-shaped orbit of the radius R of the turning body 12, when $\theta$ is 0, X is taken to 0 ($\theta$=0, X=0). Assuming that the tangential line of the revolving shaft and the shaft of the linear movement are parallel to each other, an equation (4) can be formulated between a moving amount X of the feed nut 134 and the turn angles $\theta$ of the connecting shaft 143 (the turning body 12).

$$X = R \cdot \sin(\theta) \tag{4}$$

Therefore, by differentiating both sides of the equation, the following equation (5) can be derived.

$$\frac{dX}{dt} = \frac{d\theta}{dt} \cdot R \cdot \cos(\theta) \tag{5}$$

When the turning body is turned at a designated angular velocity, the positional error is proportional to the angular velocity and is inversely proportional to the loop gain $\omega_0$ of the position control, so the positional error Ex can be derived as follows.

$$E_X = \frac{\frac{dX}{dt}}{\omega_0} = \frac{d\theta}{dt} \cdot \frac{R \cdot \cos(\theta)}{\omega_0} \quad (6)$$

In FIG. 3, the relations between the positional error $E\theta$ of the turning body 12 and the positional error $Ex$ of the above driving source can be closely analogous to $L \neq R \cdot E\theta$ and are expressed in the following equation (7), when X and $\theta$ are supposed to be at the center, though actual Ex exists behind X and $E\theta$ exists behind $\theta$ respectively.

$$L = \frac{E_X}{\cos(\theta)} = R \cdot E\theta \quad (7)$$

$$\therefore E\theta = \frac{d\theta/dt}{\omega_0}$$

From the above result, therefore, the main factor which causes the angular positional error $E\theta$ of the turning body 12 is that the equation (6) is being used while the velocity in the direction of the straight axis varies. Actually, when the angular velocity of the turning body 12 is constant, the velocity in the direction of the straight axis is varies proportionally to $R \cdot \cos(\theta)$. Considering the angular velocity of the turning body being zero, the equation (5) is differentiated and the equation (8) is derived.

$$\frac{d^2 X}{dt^2} = -R \cdot \sin(\theta) \cdot \left(\frac{d\theta}{dt}\right)^2 + R \cdot \cos(\theta) \cdot \frac{d^2\theta}{dt^2} \quad (8)$$

$$\frac{d^2 X}{dt^2} = -R \cdot \sin(\theta) \cdot \left(\frac{d\theta}{dt}\right)^2$$

Figure 4:
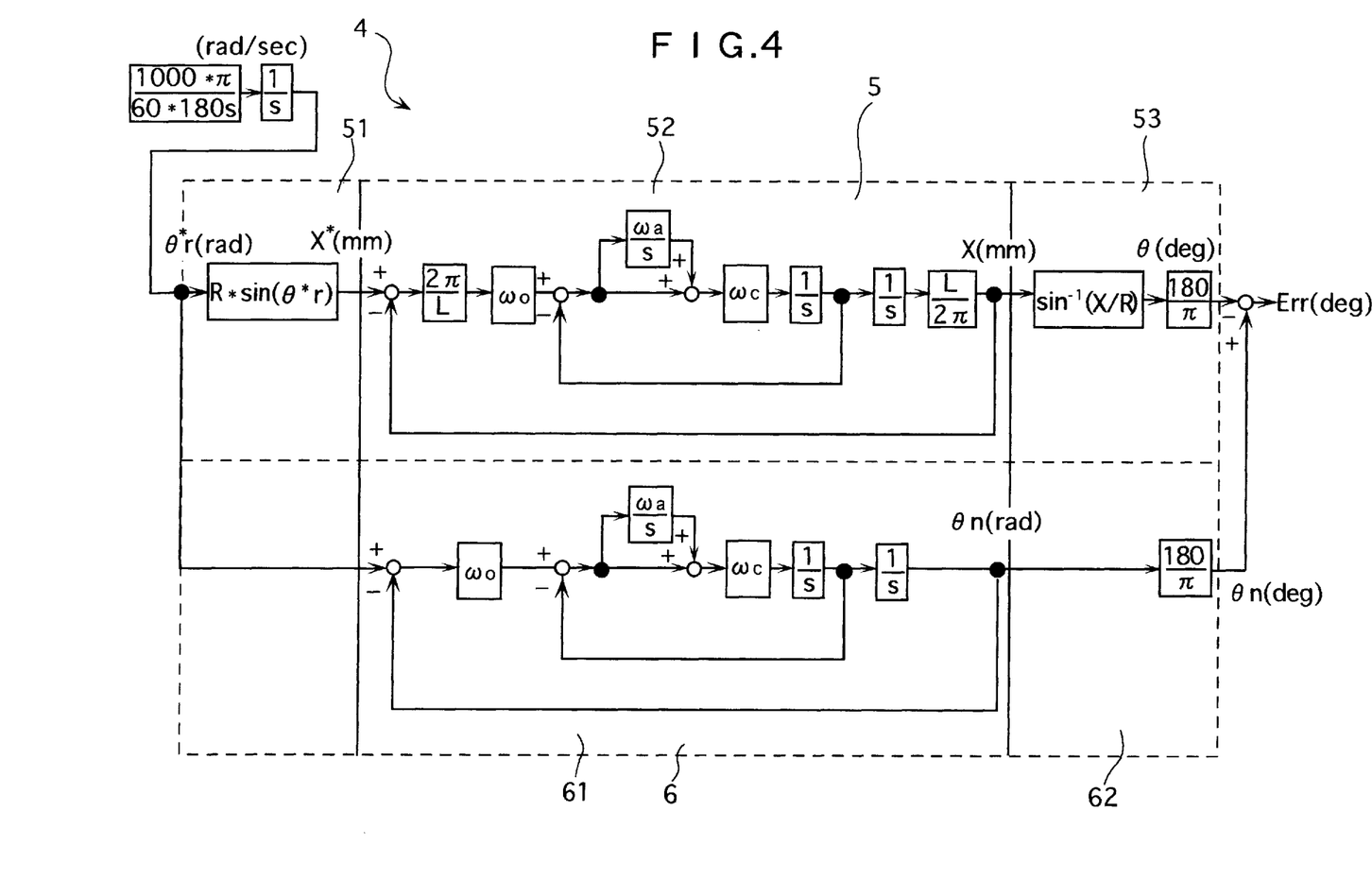
FIG. 4 is a block diagram showing a comparative control mechanism for deriving the best suited compensation signal.

Since an error could occur by the equation (8), as shown in the block diagram in FIG. 4, a simulation is carried out with a relative control mechanism 4 between the turning mechanism 1 in FIG. 2 and a turning mechanism by the revolution driving source in which a servo-motor is directedly connected to the turning body.

The first control mechanism 5 has an inputting portion 51 which inputs the turn angles $\theta^*$, a moving portion 52 which includes the turning mechanism 1 described above, and a detecting portion 53 which detects the position X of the feed nut 134 from the motion of the moving portion 52 to reversely converts X into angles.

The second control mechanism 6 has a moving portion 61 which directly turns the turning body. In the moving portion 61, the turn angle signal $\theta^*$ of the inputting portion 51 in the first control mechanism 5 is directly used, and at the same time the actual turn angle of the turning body after the movement of the moving portion 61 is detected by the detecting portion 62.

The angle of the turning body, which is detected by the control mechanism 5 are compared with the angle of the turning body detected by the control mechanism 6, and the difference is outputted as Err.

The simulation is carried out under the following condition.

| | |
|---|---|
| position control loop gain | $\omega_0$ = 30 (rad/sec) |
| speed control loop gain | $\omega_c$ = 300 (rad/sec) |
| integral compensation break point | $\omega_a$ = 100 (rad/sec) |
| turn radius | R = 883 (mm) |
| ball screw pitch | L = 8 (mm/rev) |
| feed velocity | 1000 (degree/min) |
| moving range of the turning body | 0 (degree) to 33.3333 (degree) |

Figure 5:
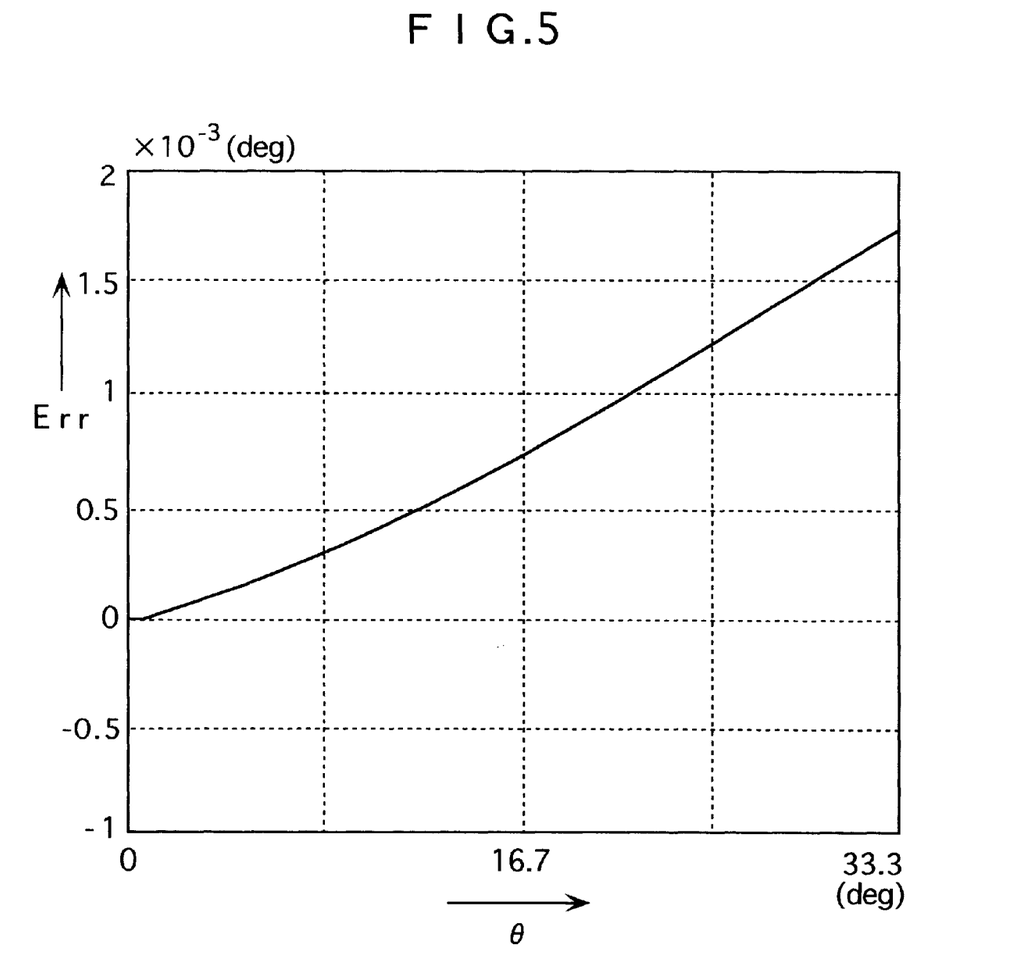
FIG. 5 is a graphical representation of a tracking error when performing a comparative control under a non-compensated condition in the above described embodiment.

When the inputted turn angle $\theta^*$ is not compensated in the inputting portion 51, as the angle $\theta$ of the turning body 12 becomes bigger, values of the Err also becomes big as shown in FIG. 5, and the maximum error of approximately 0.0017 degrees is resulted.

On the other hand, considering the error which is proportional to $(d\theta/dt)^2 \sin(\theta)$ derived from the equation (8), the compensation signal Xc is set as $Xc = K \cdot (d\theta/dt)^2 \sin(\theta)$. Then the simulation is repeated with changing the value of K, while operating the control mechanism 5, using the above-set compensation signal Xc. As a result, when the value K is $\frac{1}{2}\omega_0^2$, the value of Err is found to be nearly zero, irrespective of the value of $\theta$.

Figure 6:
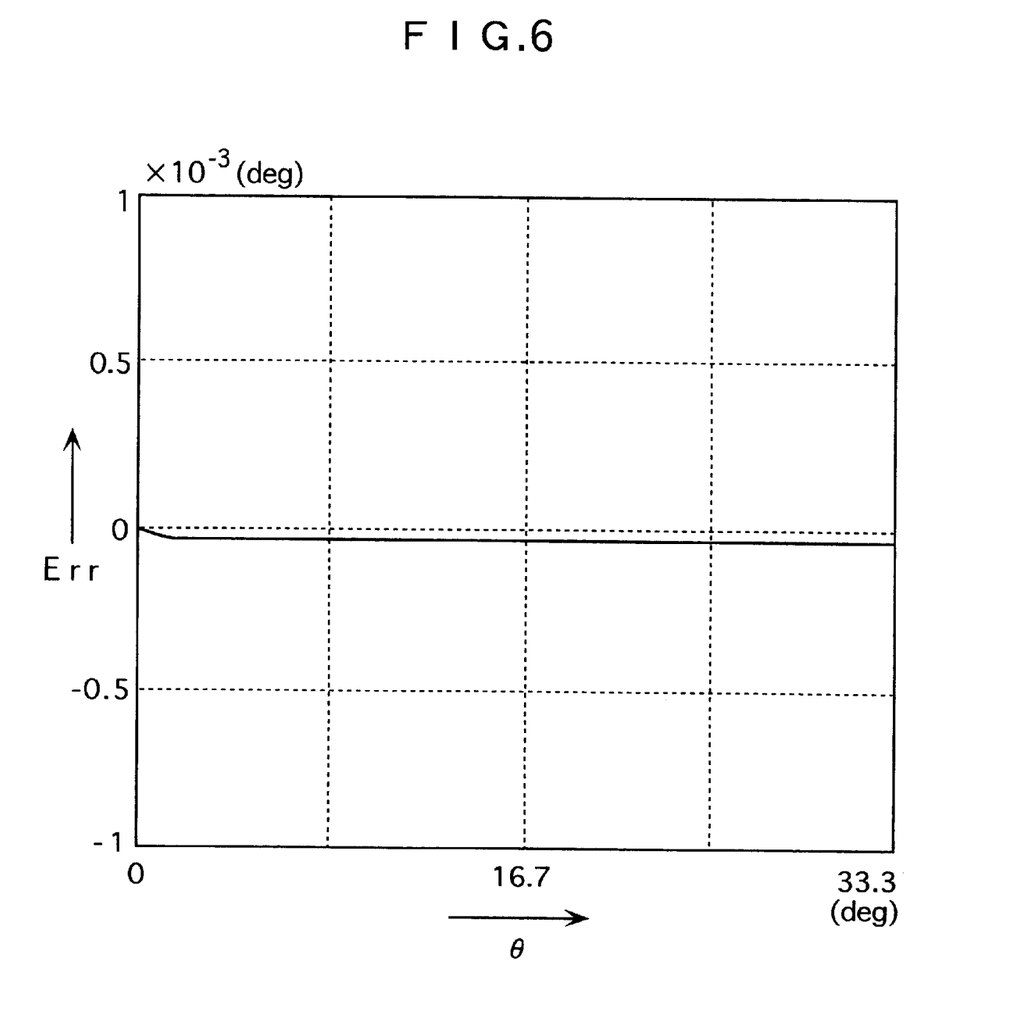
FIG. 6 is a graphical representation of a tracking error when performing a comparative control under compensated condition by a compensator in the above described embodiment.

Therefore, it is preferable to use the following compensation signal Xc for the compensator 32, $$X_C = \frac{R}{2} \cdot \frac{(d\theta^*/dt)^2}{\omega_0^2} \cdot \sin\theta^*$$

and by controlling of the turning mechanism 1 by the compensator 32 with the above Kc, few tracking errors is seen in the turning mechanism, as shown in FIG. 6.

Figure 7:
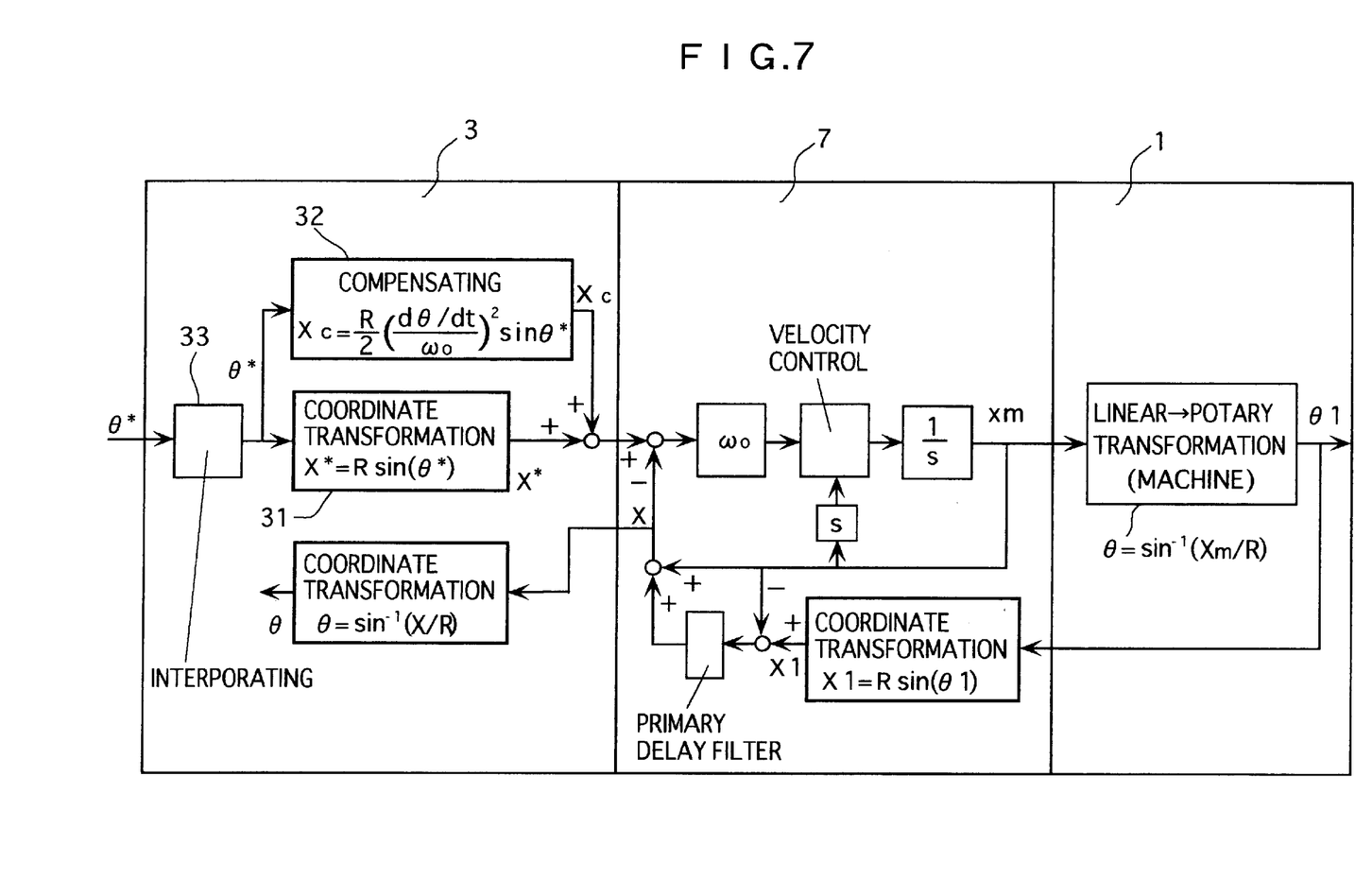
FIG. 7 is a block diagram showing a control mechanism installed with the numerical control device of the embodiment.

Accordingly, in order to control the turning mechanism 1 through a non-linear transmitting mechanism shown in FIG. 2 and FIG. 12, it is preferable that the numerical control unit 3 having the coordinate transformation device 31 and the compensator 32 is laid between the control unit 7 and the interpolating portion 33 where the angle position command value $\theta^*$ of the turning body 12 is inputted, as shown in FIG. 7. The conversion signal $X^*$ and the compensation signal Xc which are outputted from the coordinate transformation device 31 and the compensator 32, respectively, are sent as a servo-input signal Xt for the driving source 13 to the control portion 7 to move the turning mechanism 1.

According to the first embodiment described above, the following effect can be expected.

That is, the numerical control unit 3 are provided with the coordinate transformation device 31 and the compensator 32, and the servo-input signal Xt of the driving source 13 is taken from the sum of the conversion signal $X^*$ and the compensation signal Xc which are outputted from the coordinate transformation device 31 and the compensator 32 respectively.

Consequently, even the turning mechanism 1 which turns the turning body 12 by the driving source 13 which moves in a non-circular movement through the non-linear transmitting mechanism 14, the turn velocity of the turning body 12 can be stabilized with high accuracy. And the tracking error of the turning body 12 can be decreased by reducing the change of the droop of the driving source 13 using the compensator 32.

As the angular velocity $(d\theta^*/dt)$ of the turning body 12 is set larger, the compensation signal Xc becomes bigger as the operating velocity of the machine tool becomes larger. So the turning body 12 can be stably turned irrespective of the velocity of the turning body 12, when the turning mechanism with the numerical control device 3 is used.

In addition to the above effects, since the conversion signal X* is set as R·sin (θ*), and the compensation signal Xc is set as;

$$X_C = \frac{R}{2} \cdot \frac{(d\theta^*/dt)^2}{\omega_0^2} \cdot \sin\theta^*$$

in the numerical control unit 3, the tracking error in the turning mechanism 1 can be extremely reduced as shown in FIG. 6.

A second embodiment of the present invention will be explained next.

In the turning mechanism 1 relating to the first embodiment described above, the connecting shaft 143 moves in accordance with the turn of the turning body 12 along the arc of the radius R.

In a turning mechanism 2 relating to the second embodiment, however, as shown in FIG. 8, a connecting shaft 243 which connects a turning body 22 to a feed nut 234 moves along the moving direction of the feed nut 234, in other words, along the linear track.

The structure of the numerical control unit is similar to the structure of the first embodiment described above, but as the connecting shaft 243 linearly moves, the conversion signal X* by the coordinate transformation device differs from that in the first embodiment, and consequently the compensation signal Xc differs from that in the first embodiment.

For the conversion signal X* by the coordinate transformation device 31, the next equation (9) can be formulated based on the schematic drawing in FIG. 9.

$$X = R \cdot \tan(\theta) \quad (9)$$

The equation (9) is differentiated twice, as in the case of the first embodiment, to obtain the acceleration of the feed nut 234 at the angles θ of the turning body 22 and the equation (10) can be derived, considering that the angular acceleration of the turning body 22 being zero, as the turning body 22 turns at a constant velocity.

$$\frac{d^2 X}{dt^2} = 2 \cdot \left(\frac{d\theta}{dt}\right)^2 \cdot R \cdot \tan(\theta)\{1 + \tan^2(\theta)\} \quad (10)$$

Accordingly, the compensation signal Xc for the inputted turn angle signal θ* of the turning body 22 is as follows, where K is constant.

$$X_C = K \cdot \left(\frac{d\theta^*}{dt}\right)^2 \cdot \tan\theta^* \cdot \frac{(1 + \tan^2\theta^*)}{\omega_0^2}$$

A simulation is carried out from the above result, using the relative control mechanism 4 shown in FIG. 4 in the first embodiment, and an optimized value for the contant K is decided.

The simulation is carried out under the following condition.

| | |
|---|---|
| Position control loop gain | $\omega_0$ = 30 (rad/sec) |
| Speed control loop gain | $\omega_c$ = 300 (rad/sec) |
| Turn radius | R = 750 (mm) |
| Integral compensation break point | $\omega_a$ = 100 (rad/sec) |
| Ball screw pitch | L = 8 (mm/rev) |
| Feed velocity | 1000 (degree/min) |
| Moving range of the turning body | 0 (degree) to 33.333 (degree) |

Figure 10:
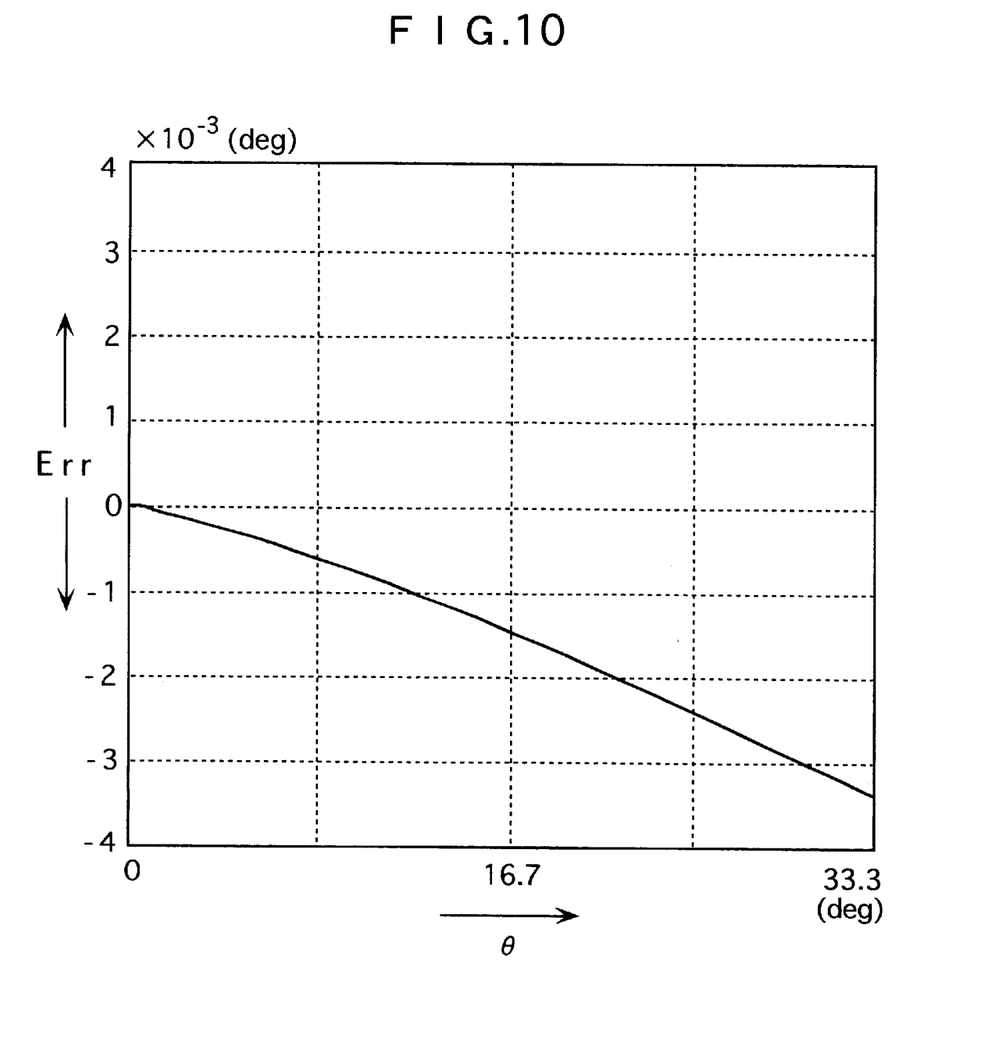
FIG. 10 is a graphical representation of a tracking error when performing a comparative control under a non-compensated condition in the above described embodiment.

As a result, in case of a non-compensated condition, as the angles θ of the turning body 12 become larger, as shown in FIG. 10, the values of Err increase in the negative direction and the maximum error of about −0.0033 degrees is produced.

Figure 11:
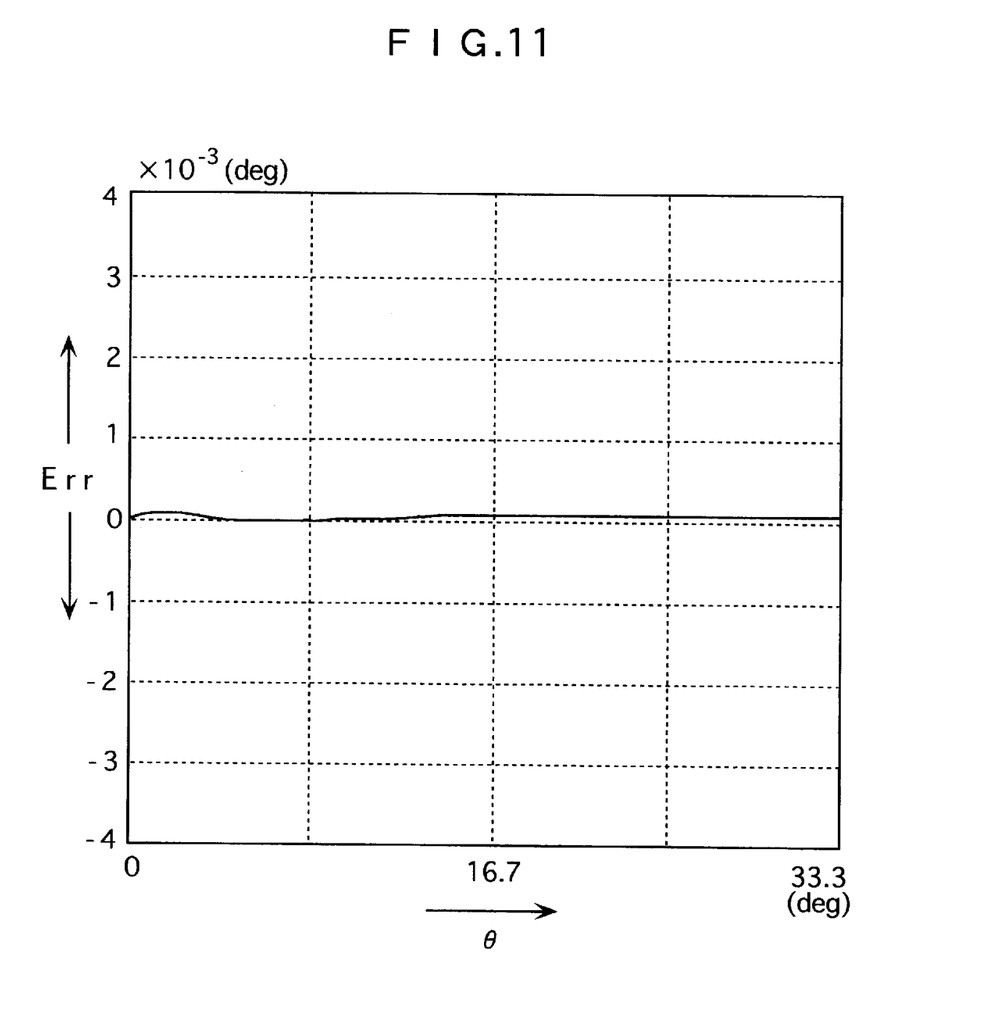
FIG. 11 is a graphical representation of a tracking error when performing a comparative control under compensated condition by a compensator in the above described embodiment.

Meanwhile, based on the above described compensation signal $$X_C = K \cdot \left(\frac{d\theta^*}{dt}\right)^2 \cdot \tan\theta^* \cdot \frac{(1 + \tan^2\theta^*)}{\omega_0^2}$$

the simulation is carried out with K being taken as K=1/ω0², and it is understood that the value of Err can be controlled to an extent of 1/10000 (degrees) as shown in FIG. 11.

Therefore, it is advisable to adopt the following Xc as a compensation signal which is used for the compensator, $$X_C = R \cdot \left(\frac{d\theta^*}{dt}\right)^2 \cdot \tan\theta^* \cdot \frac{(1 + \tan^2\theta^*)}{\omega_0^2}$$

and by controlling the turning mechanism 2 with the above value, the turning mechanism with few tracking errors can be made as shown in FIG. 11.

In controlling the turning mechanism 2, it is advisable that the turning mechanism is allowed to move in accordance with the block diagram similar to the first embodiment as shown in FIG. 7, the conversion signal X* is set to the equation (9), and the compensation signal Xc is set to the equation (11).

The second embodiment described above has the following effect in addition to the effect in the first embodiment.

That is, even when the connecting shaft 243 linearly moves along the feed nut 234, the tracking error of the turning body 22 can be extremely reduced as in the first embodiment. In addition to that, since the connecting shaft 143 is not necessary to move along the arc having a radius R as in the turning mechanism 1 of the first embodiment, the vertical slider can be omitted, and the structure of the turning mechanism can be further simplified.

Note that this invention is not limited to the embodiments described above, but it also includes following modifications.

That is, in the turning mechanism 1 of the first embodiment and in the turning mechanism 2 of the second embodiment, the driving sources are linearly moved by the feeding nuts 134 and 234, but the present invention is not limited to this movement, and the driving point of the driving source may move in a polygonal shape, in other words, the present invention can be applied to any turning mechanism which turns a turning body through a non-linear transmitting mechanism by a driving source.

Furthermore, the turning mechanism 1 of the first embodiment and the turning mechanism 2 of the second embodiment described above adopt the non-linear transmitting mechanism consisting of the horizontal slider and the vertical slider, but the present invention is not limited to this, and can be applied to the turning mechanism of a link mechanism in which a driving source and a turning body are connected with a link rod and the like.

Additionally, the specific structure and the shape, etc. can be defined in a different structure and the like, within the range of achieving the purpose of the present invention.

What is claimed is:

1. A numerical control device for a turning mechanism that turns a body about a shaft and is driven by a driving source that includes an output that moves in a non-circular motion and turns said body via a non-linear transmitting mechanism, said numerical control device comprising:
   a coordinate transformation device for outputting a signal obtained by converting a signal corresponding to an angular position of said body about said shaft while being driven by said transmitting mechanism into a position of said output of said driving source; and
   a compensator for outputting a signal obtained by computing a compensation value of said position of said output of said driving source in accordance with said signal corresponding to an angular position of said body about said shaft while being driven by said transmitting mechanism,
   the signal outputted from said coordinate transformation device and the signal outputted from said compensator being added together to form a servo-input signal to control said driving source.

2. The numerical control device of the turning mechanism according to claim 1, wherein said driving source moves in a linear movement.

3. The numerical control device of the turning mechanism according to claim 2, wherein said compensator outputs a compensation signal multiplied by a coefficient which is proportional to a square of an angular velocity of said turning body.

4. The numerical control device of the turning mechanism according to claim 3, wherein said turning angular signal is taken as $\theta^*$, said conversion signal is taken as $X^*$, said compensation signal is taken as Xc, a position control loop gain of the driving source is taken as $\omega_0$, the turn radius of said turning body is taken as R and the time is taken as t, then $X^*$ and Xc are expressed as follows, $$X^* = R \cdot \sin\theta^*,$$

$$X_C = \frac{R}{2} \cdot \frac{(d\theta^*/dt)^2}{\omega_0^2} \cdot \sin\theta^*.$$

5. The numerical control device of the turning mechanism according to claim 3, wherein said turning angular signal is taken as $\theta^*$, said conversion signal is taken as $X^*$, said compensation signal is taken as Xc, a position control loop gain of the driving source is taken as $\omega_0$, the turn radius of said turning body is taken as R and the time is taken as t, then $X^*$ and Xc are expressed as follows, $$X^* = R \cdot \tan\theta^*,$$

$$X_C = R \cdot \left(\frac{d\theta^*}{dt}\right)^2 \cdot \tan\theta^* \cdot \frac{(1+\tan^2\theta^*)}{\omega_0^2}.$$

6. The numerical control device of the turning mechanism according to claim 2, wherein said driving source has a servo-motor, a feed screw which rotates in accordance with the rotation of the revolutional shaft of the servo-motor, and a feed nut to be screwed with said screw, the feed nut linearly moving along an extending direction of the feed screw.

7. The numerical control device of the turning mechanism according to claim 6, wherein said turning angular signal is taken as $\theta^*$, said conversion signal is taken as $X^*$, said compensation signal is taken as Xc, a position control loop gain of the driving source is taken as $\omega_0$, the turn radius of said turning body is taken as R and the time is taken as t, then $X^*$ and Xc are expressed as follows, $$X^* = R \cdot \sin\theta^*,$$

$$X_C = \frac{R}{2} \cdot \frac{(d\theta^*/dt)^2}{\omega_0^2} \cdot \sin\theta^*.$$

8. The numerical control device of the turning mechanism according to claim 6, wherein said turning angular signal is taken as $\theta^*$, said conversion signal is taken as $X^*$, said compensation signal is taken as Xc, a position control loop gain of the driving source is taken as $\omega_0$, the turn radius of said turning body is taken as R and the time is taken as t, then $X^*$ and Xc are expressed as follows, $$X^* = R \cdot \tan\theta^*,$$

$$X_C = R \cdot \left(\frac{d\theta^*}{dt}\right)^2 \cdot \tan\theta^* \cdot \frac{(1+\tan^2\theta^*)}{\omega_0^2}.$$

* * * * *